Dec. 4, 1928.
C. KRÄMER
MERCURY RECTIFIER
Filed April 24, 1926
1,694,328
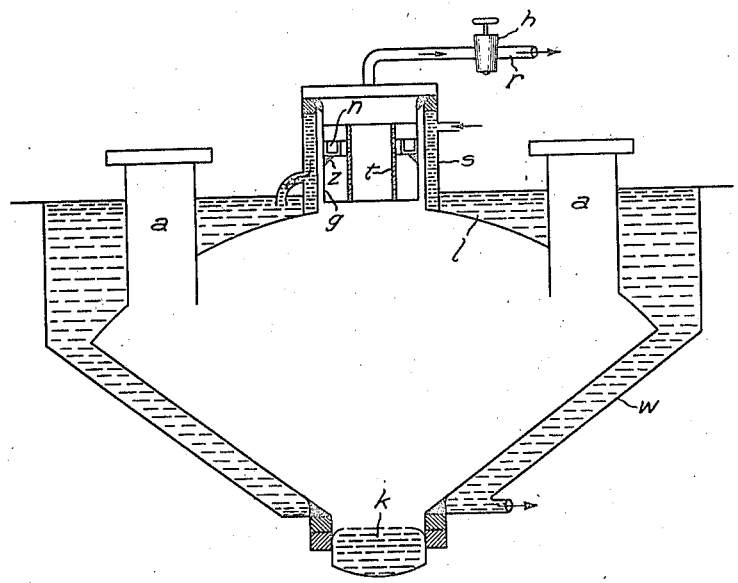
Inventor:
Christian Krämer,
by
His Attorney.

Patented Dec. 4, 1928.

1,694,328

UNITED STATES PATENT OFFICE.

CHRISTIAN KRÄMER, OF PANKOW, GERMANY, ASSIGNOR TO GENERAL ELECTRIC COMPANY, A CORPORATION OF NEW YORK.

MERCURY RECTIFIER.

Application filed April 24, 1926, Serial No. 104,461, and in Germany May 9, 1925.

The operation of rectifiers, more particularly of those with a large output, is frequently jeopardized by reverse arcs to an anode or the so-called back firing which may be due among other causes to the presence of water vapor in the rectifier vessel.

It has not been found possible hitherto to eliminate water vapor completely in large rectifiers in which the vacuum vessel is surrounded with water jackets or provided with cooling tubes with water circulation for the purpose of discharging the heat. The porosity of the metal, more particularly of the welded joints, always allows traces of water vapor to get into the interior of the vessel in which there is a very high vacuum. To that must be added the fact that water vapor contained in small quantities in the rectifiers is not indicated by the Macleod instrument utilized for measuring the vacuum, so that hitherto it has been necessary to rely on the water vapor being removed by the constantly working vacuum pumps.

According to my present invention, the water vapor is eliminated by introducing into the rectifier a substance having the property of effectively absorbing water vapor. I have indicated diagrammatically in the single figure of the drawing a mercury rectifier of large size with a suitable arrangement of the vessel containing the hygroscopic substance. $k$ is the cathode and $a$ the anode chamber of the rectifier which is cooled by a water jacket $w$. In the central branch $s$ to which is connected the suction pipe $r$ with the cock $h$, is mounted an easily removable or interchangeable receptacle $g$ which contains the hygroscopic substance such as for instance phosphorous pentoxide and is protected from the heat of the arc by a screen.

The vessel $g$ is provided on a rim $z$ with an annular insertion $n$ in which the hygroscopic substance is contained. In order to prevent also mercury particles from getting into the insertion, a highly porous clay cylinder $t$ through which the water vapor can easily diffuse, is located between the bottom and the cover of the vessel $g$.

Of course, other arrangement than that described are also possible. More particularly, several vessels with phosphorous pentoxide or with some other substance could be arranged. They need not be placed directly on the rectifier, on the contrary it is sufficient to connect them to the rectifier by means of sufficiently wide pipes.

In accordance with the provisions of the patent statutes, I have described the principles of operation of my invention, together with the apparatus which I now believe to be represented as the best embodiment of my invention, but I desire to have it understood that the apparatus shown is only illustrative and that the invention may be carried out by other means.

What I claim as new and desire to secure by Letters Patent of the United States, is:—

1. A mercury arc device comprising an anode and cathode mounted within an evacuated vessel, and a removable receptacle located within a cooled branch of said vessel and interconnected with said vessel for supporting a hygroscopic material whereby the water vapor within said vessel is absorbed and reverse arcs to said anode are prevented.

2. A mercury arc rectifier comprising an anode and cathode mounted within an evacuated vessel, and a receptacle located within said vessel and interconnected with said vessel for supporting a hygroscopic material and provided with a porous wall whereby mercury is excluded from said receptacle and water vapor is admitted thereto.

3. A mercury arc rectifier comprising an anode and cathode mounted within an evacuated vessel, and a removable receptacle located within a water cooled branch of said vessel supporting a hygroscopic material.

4. A mercury arc rectifier comprising an anode and cathode mounted within an evacuated vessel, and a removable receptacle located within said vessel supporting a hygroscopic material and provided with a wall of porous clay whereby mercury is excluded from said receptacle and water vapor is admitted thereto.

In witness whereof, I have hereunto set my hand this 31 day of March, 1926.

CHRISTIAN KRÄMER.